Patented May 21, 1929.

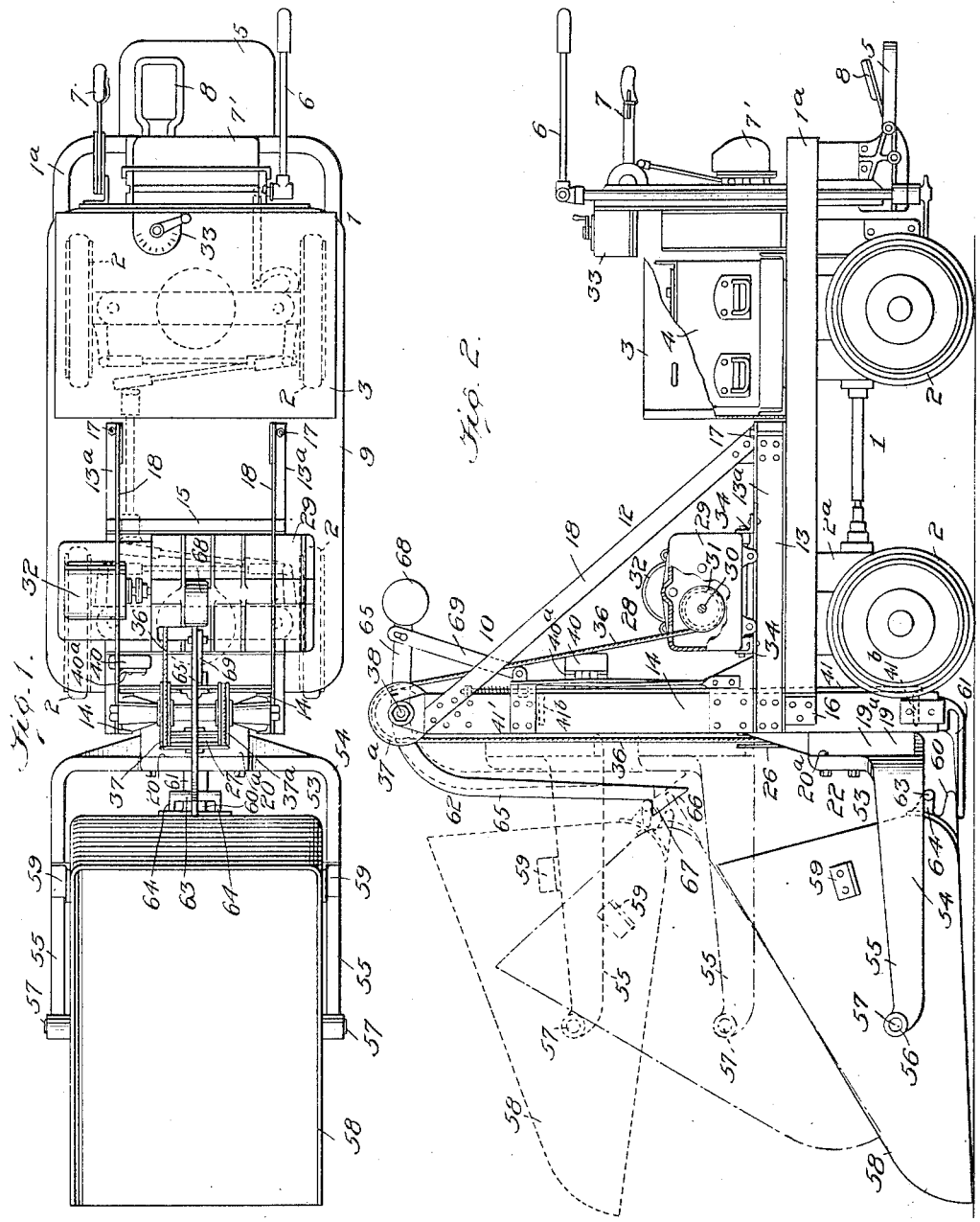

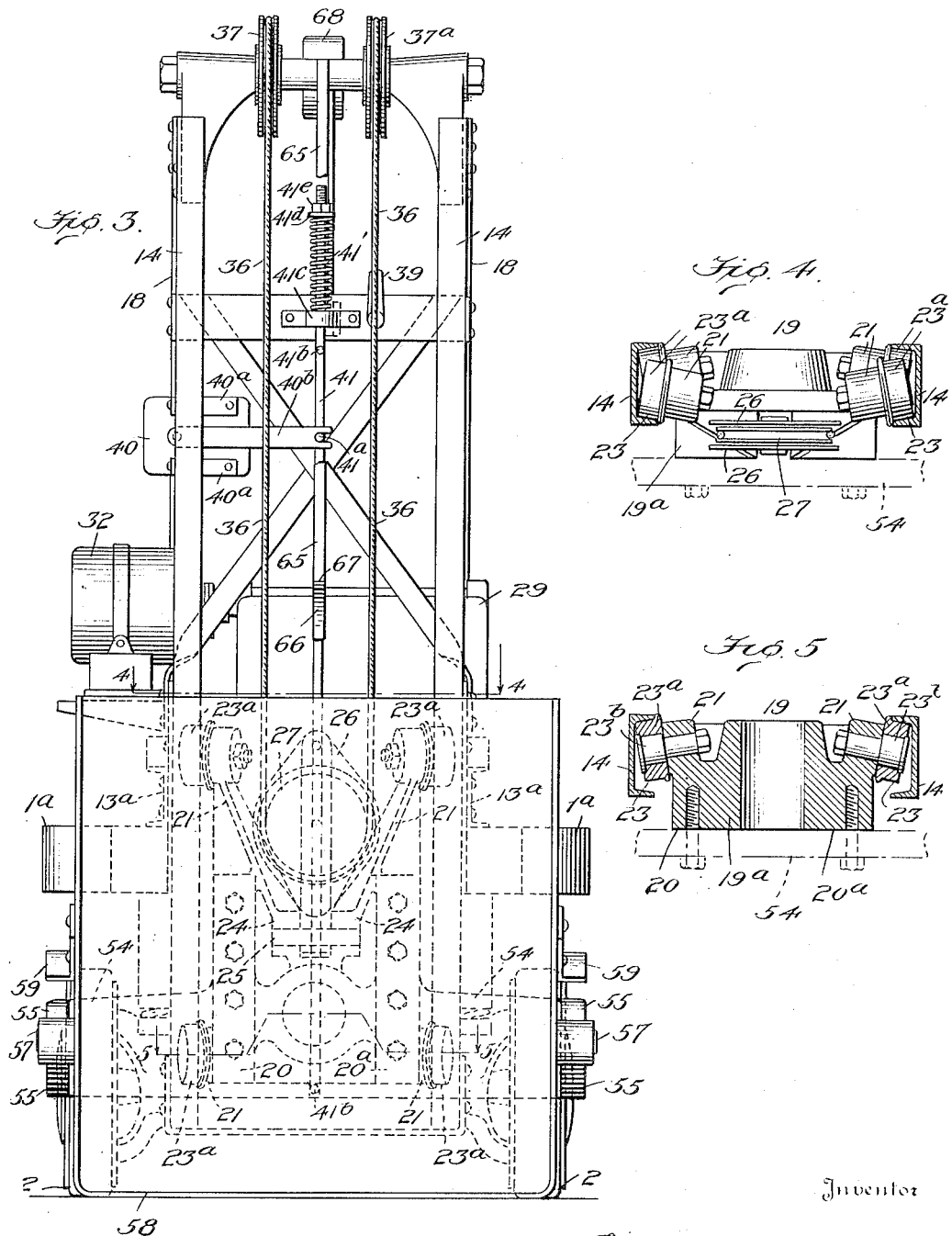

1,713,780

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Original application filed March 11, 1921, Serial No. 451,622. Divided and this application filed February 3, 1923. Serial No. 616,695.

This invention relates to a truck for industrial uses, more particularly to a truck having mounted on it a scooping, elevating and carrying mechanism, whereby goods can be transported from place to place rapidly and economically.

One object of the invention is to provide a truck having an improved mechanism so constructed that goods and materials may be readily scooped up, transported and discharged.

Another object of the invention is to mount on the frame of a truck an improved scooping, elevating and dumping mechanism of relatively simple construction, whereby the same may be readily operated.

Other objects of the invention will be apparent to those skilled in the art to which my invention relates from the following description taken in connection with the accompanying drawings.

For the purpose of illustration, I have, in the accompanying drawings, shown and herein described one form of apparatus embodying my invention.

Fig. 1 is a top plan view of a truck embodying my invention.

Fig. 2 is a side elevation of the truck.

Fig. 3 is an end elevation looking toward the right in Figs. 1 and 2.

Fig. 4 is a section on the line 4—4 of Fig. 3.

Fig. 5 is a section on the line 5—5 of Fig. 3.

In the drawings, 1 indicates as an entirety the truck or motor vehicle, preferably of the electric motor driven type, and having a frame 1$^a$ and wheels 2, certain or all of which, if desired, may be driven by a driving mechanism 2$^a$ and steered. 3 indicates a housing within which suitable storage batteries 4 may be arranged. In Figs. 1 and 2 I have shown at one end of the truck a platform 5 on which the operative may stand, and control elements 6, 7 and 8 in convenient positions for manipulation in a well-known way, the control element 7 serving to operate a suitable controller 7' to control the motor of the driving mechanism 2$^a$ and the control element 8 constituting a pedal and serving to control a brake mechanism (not shown) preferably normally applied to an element driven by the driving mechanism 2$^a$. 9 indicates a platform secured in any desired manner to the frame 1$^a$.

10 indicates as an entirety the raising and lowering mechanism rigidly mounted on the frame 1$^a$ and platform 9 of the truck 1. Of this mechanism, 12 indicates a frame preferably comprising a base 13 fixed to the frame 1$^a$ and platform 9 and a pair of space guide members 14 preferably extending vertically above and below the base 13. The guide members 14 preferably consist of channel bars, the flanges of which serve as front and rear guide walls for an elevating member 19 to be later referred to. The base 13 preferably comprises a pair of channel bars 13$^a$ which may be connected together by cross members, one thereof being indicated at 15. The frame 12 is secured to the truck by a pair of angle plates 16, which are bolted and riveted to the truck frame 1$^a$ and guide members 14, respectively, and by bolts 17 extending through the channel bars 13$^a$ near their inner ends to secure the latter to the platform 9. The upper ends of the guides 14 may be braced by a pair of tie-rods 18 rigidly secured in any well-known manner to the inner ends of the bars 13$^a$. The elevating member 19 comprises a casting having a body portion 19$^a$ provided with seats 20, 20$^a$ and pairs of upper and lower arms 21. The body portion 19$^a$ is adapted to have connected to it a scooping, lifting, carrying and dumping mechanism, indicated as an entirety at 22, which will be later described. 23 indicates devices carried by the arms 21 and arranged to engage the flanges of the guide members 14. The devices 23 preferably comprise flanged rollers 23$^a$ mounted on stud-shafts 23$^b$, the stems of which fit into openings formed in the arms 21. The arms 21 of each pair are preferably offset, relative to the central longitudinal plane of the guide members, whereby the upper devices 23 will engage the front flanges of the guide members 14 and the lower devices 23 will engage the rear flanges thereof. 24 indicates a pair of spaced lugs between which extends a pin or shaft 25. 26 indicates a frame swiveled on the pin or shaft 25 and supporting between its bifurcated members a pulley 27, the purpose of which will be later set forth.

28 indicates as an entirety mechanism for operating the elevating member 19. Of this mechanism, 29 indicates a frame preferably in the form of a casing. The opposite end walls of the casing are provided with openings to receive and support the opposite ends of a shaft 30 carrying a drum 31. 32 indicates an electric motor preferably mounted on a bracket or other extension member of the frame 29. The shaft of the motor 32 is connected through suitable gearing (not shown) with the drum shaft, whereby the latter may be driven in either direction at will. 33 indicates a suitable controller, for operating the motor 32. The controller is placed within convenient reach of the operative, see Fig. 2. 34 indicates a plurality of devices serving to rigidly clamp the casing 29 to the bars 13$^a$, at all times. 36 indicates the hoisting rope, which is adapted to be wound on and unwound from the drum 31. The rope is connected to the drum in any suitable manner. From it, the rope 36 extends upwardly around a sheave 37 loosely mounted on a shaft 38 supported by the upper ends of the guide members 14. The rope then extends downwardly around the pulley 27 and then upwardly and over a second sheave 37$^a$ on the shaft 38, its opposite end being anchored in any desired manner, for example by a clamp 39.

40 indicates a casing having pairs of suitable contact devices (one device of each pair being movable), through which electric current is established to operate the motor 32 when the lifting member is raised and lowered. 40$^b$ indicates an arm pivoted to the casing 40 and arranged to engage and operate the movable device of either pair of contact devices to break the electric circuit when the arm is swung in one direction or the other. At its outer end the arm 40$^b$ is bifurcated and straddles a pin or projection 41$^a$ carried by a movable member 41. The member 41 preferably comprises a bar and carries a pair of spaced tappets 41$^b$, 41$^b$ which projects into the path of movement of the elevating member 19 or some element carried thereby. The bar 41 is slidably mounted by suitable guide devices 41$^c$ (one being shown in Fig. 3), whereby it can move endwise in either direction. The normal position of the bar 41 is shown in Fig. 3, being held against movement downwardly by a coiled spring 41' interposed between the guide device 41$^c$ and a collar or washer 41$^d$ adjustably mounted on the upper end of the rod by a nut 41$^e$. Upon engagement of the member 19 with one of the tappets 41$^b$, the bar 41 is moved endwise and it in turn, through the pin 41$^a$, swings the arm 40$^b$, causing the latter to break the circuit. This operation shuts off the motor and arrests the elevating member 19 against further movement. If the bar 41 has been moved upwardly, it will move downwardly by gravity when the elevating member 19 is operated downwardly, until the spring 41' engages the guide device 41$^c$; if the bar 41 has been moved downwardly, such movement will compress the spring 41' which will return the bar to normal position when the elevating member 19 moves upwardly.

The scooping, lifting, carrying and dumping mechanism 22 is particularly adapted for engaging, transporting and discharging granular materials which can be arranged in a pile and scooped up therefrom. Of the scooping, lifting, carrying and dumping mechanism, 53 indicates a supporting means preferably comprising a U-shaped member 54 having its base portion removably secured in a rigid manner to the elevating member 19. At their free ends, the arms 55 of the U-member are formed with aligned openings 56 to receive trunnions 57 of a scoop 58. As shown in the drawings, the trunnions for the scoop 58 are arranged slightly forward of the center of gravity, so that the rear end of the scoop will tend to drop. 59 indicates a lug or stop device provided on one side of the scoop and arranged to engage the upper side of the adjacent arm 55, whereby the scoop will be supported in a predetermined suitable position to hold the material while it is being transported. By preference, the scoop is so shaped, that when the lug 59 engages the arm 55, the bottom of the scoop will be inclined upwardly toward the discharging end. 60 indicates a lug preferably carried at the lower rear end of the scoop 58 and extending rearwardly therefrom. 61 indicates an arm extending forwardly from some rigid part of the frame, preferably the lower end of one of the guide members 14. The arm 61 is arranged in the path of movement of the lug 60 as the scoop moves downwardly. The arm 61 is arranged relatively near the floor, as shown in Fig. 2, so that it is engaged by the lug 60 near or just prior to the limit of movement downwardly of the elevating element 19. As a result of this arrangement, when the elevating member moves downwardly, the lug 60 will engage the arm 61, thereby causing the scoop to tilt on its trunnions so that its free or scooping end will engage the floor. When in this position, the truck can be driven forwardly and thereby cause the scoop 58 to scoop up the material to be transported. Thereafter, if the raising and lowering mechanism is operated, the scoop will be raised. Due to the fact that the center of gravity of the scoop and the material therein is rearward of the trunnions, the scoop 58, when raised or elevated, will assume its normal position with the lug or stop 59 engaging the adjacent arm 55.

62 indicates a mechanism for automatically dumping the scoop. Of this mechanism, 63 indicates a transverse rod supported at the rear end of the scoop 58 by a pair of brackets 64. 65 indicates a tripping lever preferably pivoted intermediate its ends on the cross shaft 38. One arm of the lever extends downwardly and at its lower end is provided with an inclined face 66 and a hook portion 67. The other end of the lever 65 is provided with a weight 68, which tends to swing the downwardly extending arm outwardly to maintain the inclined surface 66 in the path of movement of the rod 63. 69 indicates a link pivotally connected at one end upon the frame 12 and having a pivot pin and slot connection at its other end with the lever 65. The slot is of a predetermined length so that its end walls will serve as stops to limit the movement of the lever 65 in either direction.

When the scoop 58 is elevated with its load, the rod 63 will ride the inclined surface 66 and cause the lever to swing rearwardly (see dotted lines in Fig. 2), so that the rod 63 can pass around and be arranged above the hook portion 67, whereupon the lever will swing back to its normal position under the influence of the weight 68. If now the raising and lowering mechanism is operated to lower the scoop 58, the arm 63 will engage the hook portion 67 and be arrested thereby. Such engagement will cause the scoop to rotate on its trunnions (see dotted lines in Fig. 2), thus automatically discharging or dumping the material. As the lowering operation is continued, it will be seen that the rod 63 will eventually disengage the hook portion 67 and then permit the scoop 58 to right itself. If the lowering operation is continued the lug 60 will ultimately engage the arm 61 and be tilted for scooping purposes, as already described.

From the foregoing description it will be seen that the combined raising and lowering scooping and automatic dumping mechanism shown in the drawings may be used advantageously for loading, elevating, then transporting, and finally dumping various kinds of materials in a rapid and economical manner. It will be understood that the raising and lowering mechanism is so controlled that the tilting of the scoop for scooping up of material is effected just prior to its engagement with the material; that after the material is scooped up the scoop 58 is elevated, preferably to the position shown in dotted lines in Fig. 2, and there held while the truck is being driven to the place of dumping, thereupon the elevating member 19 is lowered sufficiently to cause the dumping of the scoop. As the truck driving mechanism and the raising and lowering mechanism may be rapidly operated, it will be obvious that the truck may be operated with facility and rapidly to scoop up, transport and dump materials.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

In the construction herein disclosed I provide a plurality of means for tilting the scoop at predetermined positions as it moves in one direction. These means are arranged so that the scoop is tilted as it moves downwardly. This construction permits the scoop to be loaded and elevated to a position above the tilting means and then transported to the place of discharge; and then by operating the raising and lowering mechanism to lower the elevating member, the scoop will first discharge its load and then be positioned ready to scoop up another load without any further operations on the part of the operative.

This application is a division of my original application filed March 11, 1921, Serial No. 451,622.

What I claim is:

1. In apparatus of the class described, the combination with a self-propelled truck having a frame, of a guide frame on said truck frame, an element guided upwardly and downwardly by said guide frame, means for moving said element upwardly and downwardly, a lifting member trunnioned on said element, and inter-engaging elements carried by one of said frames and said lifting member and arranged to automatically co-act at a predetermined position in the movement of said guided element in one direction to swing said lifting member about its trunnions.

2. In apparatus of the class described, the combination with a self-propelled truck having a frame, of a guide frame on said truck frame, an element guided upwardly and downwardly by said guide frame, means for moving said element upwardly and downwardly, a lifting member trunnioned on said element, a pair of devices carried by one of said frames, one of said devices being disposed intermediate the travel of said guided element along said guide frame, and means on said lifting member arranged to engage said devices successfully as said element moves in one direction.

3. In apparatus of the class described, the combination with a self-propelled truck having a frame, of a guide frame on said truck frame, an element slidably engaging said guide frame, means for moving said element upwardly and downwardly, a lifting member trunnioned on said element, and means carried by said lifting member and one of said frames for tilting said member at a predetermined position intermediate the travel of said element along said guide frame, said means being constructed and arranged to permit movement of said lifting member upwardly beyond the operating portion of the tilting element carried by one of said frames but to engage and tilt said member when it moves downwardly.

4. In apparatus of the class described, the combination with a self-propelled truck having a frame, of a guide frame on said truck frame, an element guided upwardly and downwardly by said guide frame, means for moving said element upwardly and downwardly, a lifting member trunnioned on said element, and means carried by said lifting member and one of said frames for tilting said member at a predetermined position, said means comprising a lever provided with a hook and an incline and a device on said lifting member arranged to engage the incline to swing the lever on its fulcrum and permit said device to move to a point above the hook, whereby said device may engage said hook to trip said lifting member when the latter is lowered.

5. In apparatus of the class described, the combination with a self-propelled truck having a frame, of a guide frame on said truck frame, an element guided upwardly and downwardly by said guide frame, means for moving said element upwardly and downwardly, a lifting member trunnioned on said element, means carried by said lifting member and one of said frames for tilting said member at a predetermined position, said means comprising a lever provided with a hook and an incline and a device on the lifting member arranged to engage the incline to swing the lever on its fulcrum and permit said device to move to a point above the hook, whereby said device may engage said hook to trip said lifting member when the latter moves downwardly, and means for again tilting said member during its movement downwardly.

6. In apparatus of the class described, the combination of a frame having supporting wheels, a guide frame, a support slidable in said guide frame, a lifting member trunnioned on said support, engaging means extending laterally from said lifting member, and a plurality of devices disposed in the path of movement of said engaging means as said member moves in one direction and each arranged through its engagement with said engaging means to tilt said member on its trunnions, one of said devices being between the limits of movement of said slidable support.

7. In apparatus of the class described, the combination of a frame having supporting wheels, a guide frame, a support movable in said guide frame and provided with a pair of spaced arms, a scoop trunnioned on said arms at a point laterally of its center of gravity and having a stop engaging said support to limit its movement in one direction whereby said scoop is maintained in a substantially horizontal position, means for raising and lowering said support, and means comprising a plurality of elements in vertical arrangement along the travel of said scoop and an element on said scoop successively inter-engageable with said elements to tilt said scoop at a plurality of positions as said support moves in one direction.

8. In apparatus of the class described, the combination of a frame having supporting wheels, a guide frame, a support movable in said guide frame and provided with a pair of spaced arms, a scoop trunnioned on said arms at a point laterally of its center of gravity and having a stop engaging said support to limit its movement in one direction whereby said scoop is maintained in a substantially horizontal position, means for raising and lowering said support, and means comprising a plurality of elements in vertical arrangement along the travel of said scoop and an element on said scoop successively inter-engageable with said elements to tilt said scoop at a plurality of positions as said support moves downwardly.

9. In apparatus of the class described, the combination of a frame having supporting wheels, a guide frame, a support slidable upwardly and downwardly in said guide frame and provided with a pair of spaced arms, a scoop trunnioned on said arms on a transverse axis disposed laterally of its center of gravity and having a stop engaging said support to limit its movement in one direction whereby said scoop is maintained in a substantially horizontal position, means for raising and lowering said support, and a device intermediate the ends of movement of said support arranged to engage said scoop and tilt it as said support moves in one direction.

10. In apparatus of the class described, the combination with a self-propelled truck having a frame, of a guide frame on said truck frame, an element guided upwardly and downwardly by said guide frame, means for moving said element upwardly and downwardly, a lifting and dumping member trunnioned on said element, inter-engaging devices carried by one of said frames and said lifting and dumping member for tilting the latter at a predetermined position as said element moves in one direction, and a separate device for tilting said lifting and dumping member as it moves in one direction.

11. In apparatus of the class described, the combination of a frame, wheels for supporting said frame, a guide frame on said truck frame, an element guided upwardly and downwardly by said guide frame, means for moving said element upwardly and downwardly, a lifting member trunnioned on said element, and means carried by said lifting member and one of said frames for tilting said member at a predetermined position, said means comprising a lever provided with a hook and an incline and a device on said lifting member arranged to engage the incline to swing the lever on its fulcrum and permit said device to move to a point above the hook, whereby said element may engage said hook to trip said lifting member when the latter is lowered.

In witness whereof, I have hereunto subscribed my name.

EDWARD H. REMDE.